(12) United States Patent
Miura et al.

(10) Patent No.: US 11,697,339 B2
(45) Date of Patent: Jul. 11, 2023

(54) VEHICLE DRIVE APPARATUS

(71) Applicant: Nissan Motor Co., Ltd., Yokohama (JP)

(72) Inventors: Yoshitaka Miura, Kanagawa (JP); Masato Koga, Kanagawa (JP); Atsushi Tsukizaki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 56 days.

(21) Appl. No.: 17/621,712

(22) PCT Filed: Jun. 26, 2019

(86) PCT No.: PCT/IB2019/000670
§ 371 (c)(1),
(2) Date: Dec. 22, 2021

(87) PCT Pub. No.: WO2020/260916
PCT Pub. Date: Dec. 30, 2020

(65) Prior Publication Data
US 2022/0242222 A1    Aug. 4, 2022

(51) Int. Cl.
*B60K 6/547* (2007.10)
*B60K 6/36* (2007.10)
*B60K 6/40* (2007.10)
*B60K 6/387* (2007.10)
*B60K 6/442* (2007.10)
*B60K 6/48* (2007.10)

(52) U.S. Cl.
CPC ............. *B60K 6/547* (2013.01); *B60K 6/36* (2013.01); *B60K 6/387* (2013.01); *B60K 6/442* (2013.01); *B60K 2006/4833* (2013.01); *B60Y 2200/92* (2013.01)

(58) Field of Classification Search
CPC .......... B60K 6/547; B60K 6/36; B60K 6/387; B60K 6/44; B60K 6/40; B60K 2006/4833; F16H 2200/0021; F16H 3/091; F16H 3/126; F16H 2200/0034; F16H 3/093; F16H 2003/0931; F16H 2003/0938; F16H 2003/0936; B60Y 2200/92
See application file for complete search history.

(56) References Cited

U.S. PATENT DOCUMENTS

| 9,309,933 B2 | 4/2016 | Date |
| 10,279,673 B2 * | 5/2019 | Tsukizaki ............... F16H 61/02 |
| 2002/0084118 A1 * | 7/2002 | Esaki ................. F16H 61/0028 903/917 |
| 2019/0291563 A1 * | 9/2019 | Ogino ................... B60K 17/04 |

FOREIGN PATENT DOCUMENTS

| JP | 2017-144993 A | 8/2017 |
| WO | 2013/129011 A1 | 9/2013 |

* cited by examiner

*Primary Examiner* — Tisha D Lewis
(74) *Attorney, Agent, or Firm* — Global IP Counselors, LLP

(57) ABSTRACT

A vehicle drive apparatus includes an internal combustion engine, an electric-power-generating-motor gear train, a drive gear, a driven gear, a differential, a low clutch and a high clutch. The electric-power-generating-motor gear train and the driven gear are arranged on a first plane. The drive gear, the driven gear, and the differential are arranged on a second plane. The low clutch and the high clutch are arranged on a third plane.

2 Claims, 3 Drawing Sheets

FIG. 2 – (Prior Art)

VEHICLE DRIVE APPARATUS

CROSS-REFERENCE TO RELATED APPLICATIONS

This application is a U.S. national stage application of International Application No. PCT/IB2019/000670, filed on Jun. 26, 2019.

BACKGROUND

Technical Field

The present invention relates to a vehicle drive apparatus.

Background Information

International Publication No. 2013/129011 (Patent Document)1 discloses a vehicle drive apparatus in which the vehicle drive apparatus comprising an engine, a travel motor, an electric-power generator, and a gear box.

SUMMARY

In the prior art described above, there was a necessity to reduce an axial-direction dimension of an output shaft in an internal combustion engine when adding a high/low two-speed gear shifting mechanism that is directly coupled with the output shaft. It is an object of the present invention to provide a vehicle drive apparatus in which it is possible to reduce an axial-direction dimension of an output shaft in an internal combustion engine.

In the present invention, a vehicle drive apparatus comprises a first gear train that transfers rotation of a first gear to a first rotary electrical machine, the first gear being secured to an output shaft of an internal combustion engine, and a second gear that is rotatably supported on a countershaft and meshes with the first gear are arranged on a first plane;

a third gear that is rotatably supported on the output shaft, a fourth gear that is secured to the countershaft and meshes with the third gear, and a second gear train that transfers rotation of the fourth gear to a vehicle driveshaft are arranged on a second plane; and a first clutch configured to engage the second gear with the countershaft and a second clutch configured to engage the third gear with the output shaft are arranged on a third plane located between a first plane and a second plane.

Thus, it is possible in the present invention to reduce an axial-direction dimension of an output shaft in an internal combustion engine.

BRIEF DESCRIPTION OF THE DRAWINGS

Referring now to the attached drawings which form a part of this original disclosure.

DETAILED DESCRIPTION OF EMBODIMENTS

Figure 1:
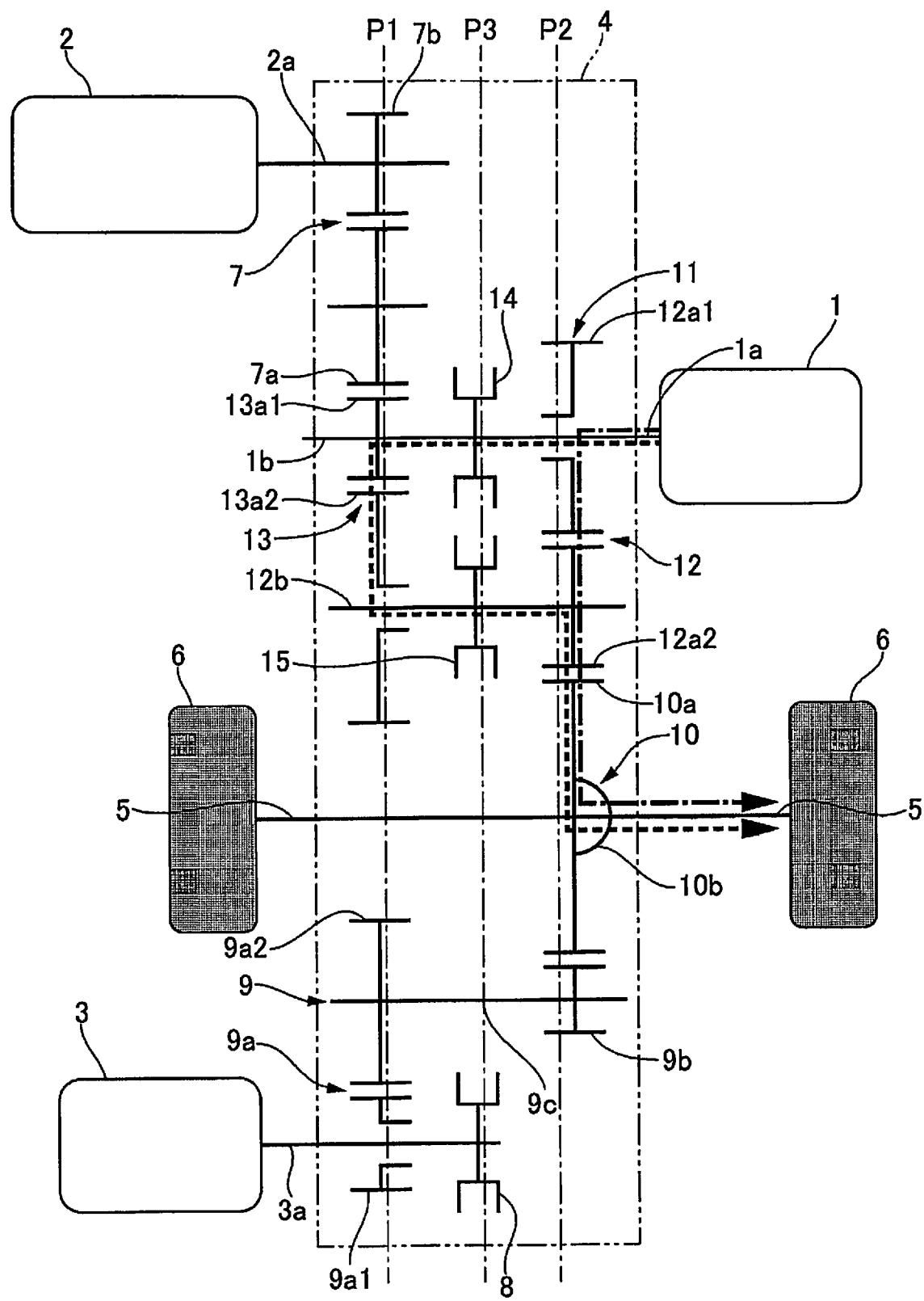
FIG. 1 is a schematic diagram showing a vehicle drive apparatus according to the first embodiment.

An embodiment of the present invention will now be described with reference to the drawings. In the description, the same elements have been designated by the same reference numerals, and redundant explanations have been omitted.

First Embodiment

FIG. 1 is a schematic diagram showing a vehicle drive apparatus according to a first embodiment. The vehicle in the first embodiment is a hybrid vehicle configured to travel by switching between a series scheme and a parallel scheme. The vehicle drive apparatus is provided with an engine (an internal combustion engine) 1, an electric-power-generating motor (a first rotary electrical machine) 2, a travel motor (a second rotary electrical machine) 3, a gear box 4, a driveshaft (a vehicle driveshaft) 5, and drive wheels 6. In the gear box 4, a plurality of gear trains (an electric-power-generating-motor gear train 7, a travel-motor reduction mechanism 9, a differential (a second gear train) 10, and an engine shifting mechanism 11) are accommodated inside a casing.

A crankshaft (an output shaft) 1a of the engine 1 is provided integrally with an input shaft 1b accommodated in the gear box 4. The input shaft 1b is connected to a motor shaft 2a of the electric-power-generating motor 2 via the electric-power-generating-motor gear train 7. The electric-power-generating-motor gear train (a first gear train) 7 has two gears 7a, 7b that mesh with each other. The drive gear 7a meshes with a drive gear (a first gear 13a1) secured to the input shaft 1b. The driven gear 7b is secured to the motor shaft 2a.

A motor shaft 3a of the travel motor 3 can be coupled with a drive gear 9a1 of the travel-motor reduction mechanism 9 via a motor-travel clutch 8 accommodated in the gear box 4. The motor-travel clutch 8 is a dog clutch that does not have a rotation synchronization mechanism and is thereby engaged by a meshing stroke in a rotation-synchronized state. When (a sleeve of) the motor-travel clutch 8 is at a left-side engagement position (left), the motor shaft 3a and the drive gear 9a1 of the travel-motor reduction mechanism 9 are coupled. When (the sleeve of) the motor-travel clutch 8 is at a right-side release position (right), the motor shaft 3a and the drive gear 9a1 are uncoupled.

The travel-motor reduction mechanism 9 has a travel-motor gear train 9a and a travel-motor final reduction gear 9b. The travel-motor gear train 9a has two gears 9a1, 9a2 that mesh with each other. The drive gear 9a1 is a free-rotating gear that is rotatably supported on the motor shaft 3a. The driven gear 9a2 is secured to a rotating shaft 9c. The travel-motor final reduction gear 9b is secured to the rotating shaft 9c. The travel-motor final reduction gear 9b meshes with a ring gear 10a of the differential 10. In addition to the ring gear 10a, the differential 10 is provided with a differential case 10b having an actuating mechanism unit (not shown) in the interior thereof. Left/right side gears of the actuating mechanism unit are coupled with left/right driveshafts 5. The left/right driveshafts 5 are coupled with the drive wheels 6.

The engine shifting mechanism 11 is an automatic shifter configured to switch between a low-gear stage and a high-gear stage, and has a high-gear-stage gear train 12, a low-gear-stage gear train 13, a high clutch (a second clutch) 14, and a low clutch (a first clutch) 15. The high-gear-stage gear train 12 has two gears 12a1, 12a2 that mesh with each other. The drive gear (a third gear) 12a1 is a free-rotating gear that is rotatably supported on the input shaft 1b. The drive gear 12a1 can be coupled with the input shaft 1b via the high clutch 14. The driven gear (a fourth gear) 12a2 is secured to a countershaft 12b and meshes with the ring gear (a reduction large gear) 10a of the differential 10. Specifically, the driven gear 12a2 additionally serves as a reduction small gear (an engine final reduction gear) of a final reduction device. The low-gear-stage gear train 13 has two gears 13a1, 13a2 that mesh with each other. The driven gear (a second gear) 13a2 is a free-rotating gear that is rotatably supported on the countershaft 12b. The driven gear 13a2 can be coupled with the countershaft 12b via the low clutch 15. The low-gear-stage gear train 13 has a higher shift ratio than the high-gear-stage gear train 12.

The high clutch 14 is a dog clutch that does not have a rotation synchronization mechanism and is thereby engaged by a meshing stroke in a rotation-synchronized state. When (a sleeve of) the high clutch 14 is at a right-side engagement position (right), the drive gear 12a1 and the input shaft 1b are coupled. When (the sleeve of) the high clutch 14 is at a left-side release position (left), the drive gear 12a1 and the input shaft 1b are uncoupled. The engine shifting mechanism 11 reaches a high-gear stage due to the engagement of the drive gear 12a1 and the input shaft 1b. A path indicated by a single-dot chain line in FIG. 1 is a motive power propagation path extending from the engine 1 to the drive wheels 6.

The low clutch 15 is a dog clutch that does not have a rotation synchronization mechanism and is thereby engaged by a meshing stroke in a rotation-synchronized state. When (a sleeve of) the low clutch 15 is at a left-side engagement position (left), the driven gear 13a2 and the countershaft 12b are coupled. When (the sleeve of) the low clutch 15 is at a right-side release position (right), the driven gear 13a2 and the countershaft 12b are uncoupled. The engine shifting mechanism 11 reaches a low-gear stage due to the engagement of the driven gear 13a2 and the countershaft 12b. A path indicated by a dashed line in FIG. 1 is a motive power propagation path extending from the engine 1 to the drive wheels 6.

Three planes P1, P2, P3 that extend in a direction orthogonal to an axial direction of the crankshaft 1a are established. The planes P1, P2, P3 are parallel to each other. The first plane P1 and the second plane P2 are positioned on the left and right sides, respectively, and the third plane P3 is positioned between the first plane P1 and the second plane P2. The electric-power-generating-motor gear train 7, the low-gear-stage gear train 13, and the travel-motor reduction mechanism 9 are arranged on the first plane P1. The high-gear-stage gear train 12 and the differential 10 are arranged on the second plane P2. (The sleeves of) the high clutch 14, the low clutch 15, and the motor-travel clutch 8 are arranged on the third plane P3.

In the vehicle in the first embodiment, engaging the motor-travel clutch 8 and releasing both the high clutch 14 and the low clutch 15 effects travel under a series hybrid mode in which only the travel motor 3 is used as a motive power source for travel and the engine 1 is used as a motive power source for electric power generation. In addition, releasing the motor-travel clutch 8 and selectively engaging one of the high clutch 14 and the low clutch 15 effects travel under an engine direct coupling mode in which only the engine 1 is used as a motive power source for travel. The engine shifting mechanism 11 can switch between the low-gear stage and the high-gear stage in the engine direct coupling mode. In the vehicle in the first embodiment, engaging the motor-travel clutch 8 in a state where one of the high clutch 14 and the low clutch 15 has been engaged enables travel in a parallel hybrid mode.

Figure 2:
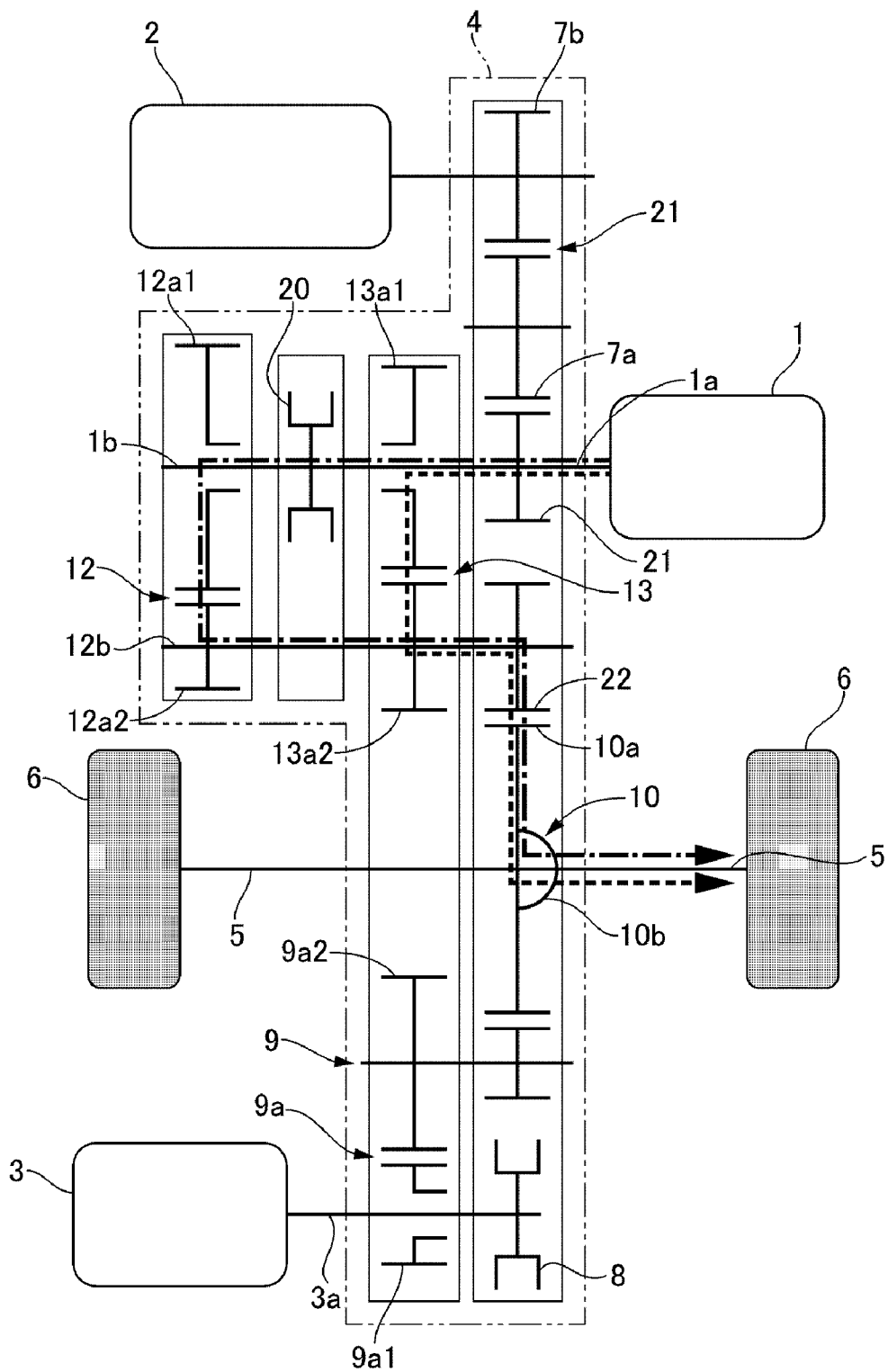
FIG. 2 is a schematic diagram showing a comparative example.

Effects of the first embodiment are described next. FIG. 2 shows a comparative example for the first embodiment and is such that a shifting clutch 20 is arranged on one shaft (input shaft 1b) to configure a two-stage shifting transmission. The drive gear 12a1 of the high-gear-stage gear train 12 and the drive gear 13a1 of the low-gear-stage gear train 13 are free-rotating gears that are rotatably supported on the input shaft 1b. The shifting clutch 20 is a dog clutch and is arranged between the two drive gears 12a1, 13a1 in the axial direction of the crankshaft 1a. When (a sleeve of) the shifting clutch 20 is at a left-side engagement position (left), the drive gear 12a1 and the input shaft 1b are coupled, the drive gear 13a1 and the input shaft 1b are uncoupled, and the high-gear stage is reached. When (the sleeve of) the shifting clutch 20 is at a right-side engagement position (right), the drive gear 13a1 and the input shaft 1b are coupled, the drive gear 12a1 and the input shaft 1b are uncoupled, and the low-gear stage is reached. When (the sleeve of) the shifting clutch 20 is at a central release position (N), the drive gear 12a1 and the input shaft 1b are uncoupled, the drive gear 13a1 and the input shaft 1b are uncoupled, and a neutral stage is achieved.

A gear 21 that meshes with the drive gear 7a of the electric-power-generating-motor gear train 7 is secured to the input shaft 1b. The driven gear 12a2 of the high-gear-stage gear train 12 and the driven gear 13a2 of the low-gear-stage gear train 13 are secured to the countershaft 12b. An engine final reduction gear 22 that meshes with the ring gear 10a of the differential 10 is also secured to the countershaft 12b.

When selectively switching gears directly coupled with the output shaft of the engine to configure a high/low two-speed transmission, in cases where the shifting clutch 20 is arranged on one shaft (input shaft 1b) as in the comparative example, the two free-rotating gears (two drive gears 12a1, 13a1) and (the sleeve of) the shifting clutch 20 are lined up on the one shaft. Furthermore, a gear 21 for continuously driving the electric-power-generating motor 2 by means of the engine 1 must be provided on the input shaft 1b. Specifically, in the comparative example, because there is a four-train arrangement in which four elements are lined up on one shaft, the axial-direction dimension of the crankshaft 1a increases and vehicle mounting properties deteriorate.

However, in the drive apparatus in the first embodiment, the shifting clutch is distributed on two shafts (input shaft 1b, countershaft 12b) as the high clutch 14 and the low clutch 15. This makes it possible for the drive gear that is secured to the input shaft 1b (drive gear 13a1 in the first embodiment), among the two drive gears 12a1, 13a1, to be used as a gear for continuously driving the electric-power-generating motor 2. Therefore, the number of elements lined up on each of the input shaft 1b and the countershaft 12b is three, and it is possible to realize a three-train arrangement. Thus, the axial-direction dimension of the crankshaft 1a can be reduced and vehicle mounting properties can be improved to a greater extent than in the comparative example, which has a four-train arrangement. Because the number of rotating shafts is the same as in the comparative example, the dimension in a direction orthogonal to the crankshaft 1a does not increase even though the shifting clutch is distributed on two shafts.

In the drive apparatus in the first embodiment, the driven gear 12a2 of the high-gear-stage gear train 12 meshes with the ring gear 10a of the differential 10. Specifically, the driven gear 12a2 serves as both a driven gear of a (two-speed) gear train for a high shift ratio and a reduction small gear of a final reduction device. In cases where the reduction small gear of the final reduction device is instead provided separately from the driven gear 12a2, four elements are lined up on the countershaft 12b. However, due to the driven gear 12a2 additionally serving as the reduction small gear, the number of elements lined up on the countershaft 12b is three, and it is possible to reduce the dimension of the axialdirection-dimension of the crankshaft 1a.

Second Embodiment

Figure 3:
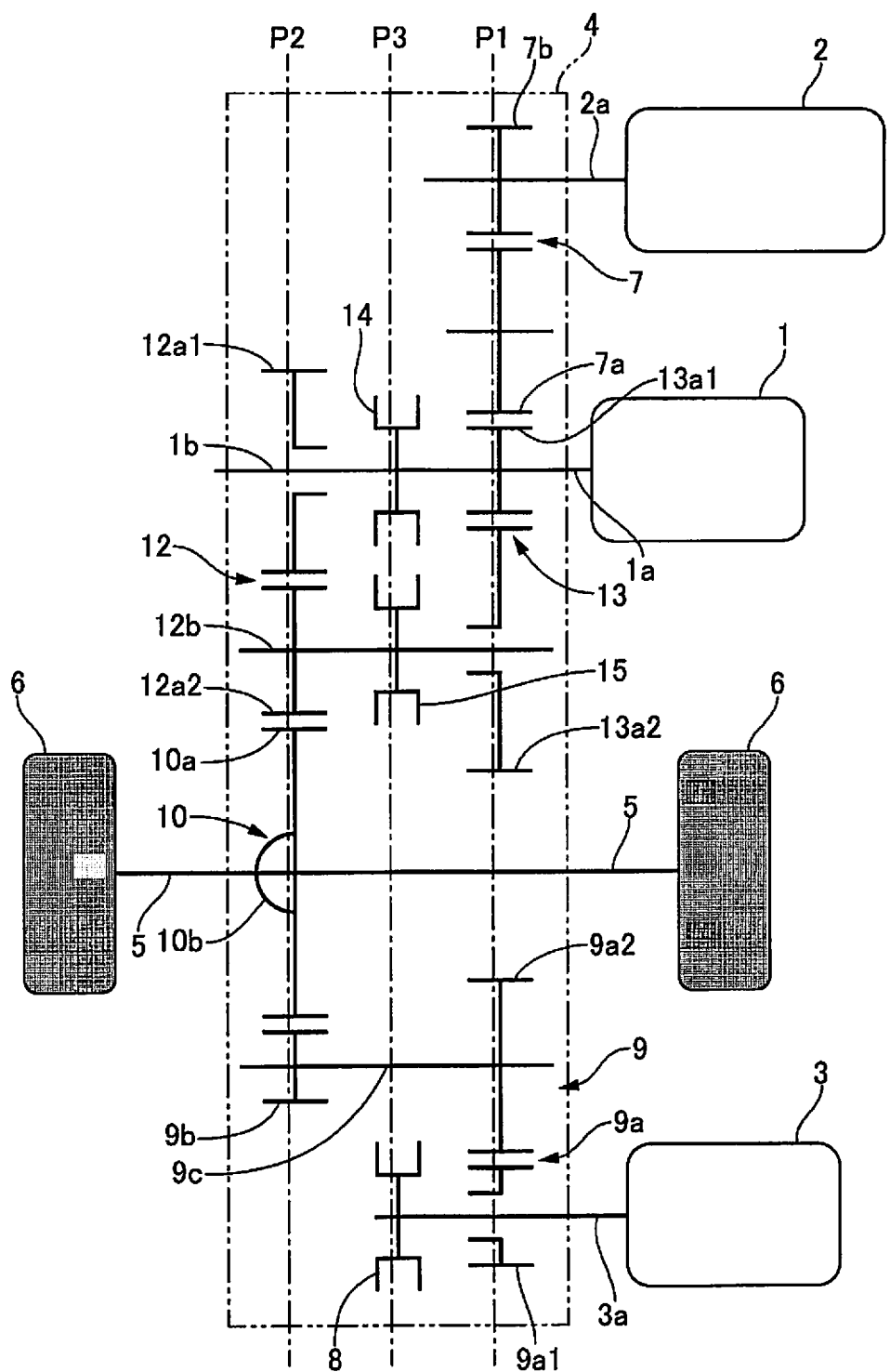
FIG. 3 is a schematic diagram showing a vehicle drive apparatus according to the second embodiment.

The basic configuration of the second embodiment is the same as that in the first embodiment, and therefore only portions differing from those in the first embodiment are described. FIG. 3 is a schematic diagram showing a vehicle drive apparatus according to the second embodiment. The second embodiment differs from the first embodiment in that, inside the gear box 4: the electric-power-generating-motor gear train 7, the low-gear-stage gear train 13, and the travel-motor reduction mechanism 9 are arranged on a left side relative to (the sleeves of) the motor-travel clutch 8, the high clutch 14, and the low clutch 15; and the high-gear-stage gear train 12 and the differential 10 are arranged on a right side relative to (the sleeves of) the motor-travel clutch 8, the high clutch 14, and the low clutch 15. The electric-power-generating motor 2 and the travel motor 3 are arranged on the right side of the gear box 4. Thus, the positions of the first plane P1 and the second plane P2 in the second embodiment are opposite those in the first embodiment, and the first plane P1, the third plane P3, and the second plane P2 are lined up in the stated order from the right side. The second embodiment also exhibits the same effects as in the first embodiment.

Other Embodiments

A mode for carrying out the present invention has been described above on the basis of the embodiments, but the specific configuration of the present invention is not limited to these embodiments; design changes, etc., that do not depart from the scope of the invention are also included in the present invention. For example, the first gear and the second gear may form the low-gear-stage gear train, and the third gear and the fourth gear may form the high-gear-stage gear train.

The invention claimed is:

1. A vehicle drive apparatus comprising:
an internal combustion engine;
a first rotary electrical machine configured to be driven to generate electrical power by the internal combustion engine;
a second rotary electrical machine configured to drive a vehicle driveshaft to rotate via a reducer;
a first gear secured to an output shaft of the internal combustion engine;
a first gear train configured to transfer rotation of the first gear to the first rotary electrical machine;
a countershaft arranged parallel to the output shaft;
a second gear rotatably supported on the countershaft and meshed with the first gear;
a third gear rotatably supported on the output shaft;
a fourth gear secured to the countershaft and meshed with the third gear;
a second gear train configured to transfer rotation of the fourth gear to the vehicle driveshaft;
a first clutch configured to engage the second gear with the countershaft;
a second clutch configured to engage the third gear with the output shaft; and
a third clutch configured to connect and disconnect propagation of a motive power between the second rotary electrical machine and the reducer,
the first gear train and the second gear being arranged on a first plane that extends in a direction orthogonal to an axial direction of the output shaft,
the third gear, the fourth gear, and the second gear train being arranged on a second plane that is set apart by a prescribed axial-direction distance from the first plane and that is parallel to the first plane, and
the first clutch and the second clutch being arranged on a third plane that is parallel to the first plane and that is positioned between the first plane and the second plane.

2. The vehicle drive apparatus according to claim 1, wherein
the fourth gear is a reduction small gear that meshes with a reduction large gear in the second gear train.

* * * * *